Patented Jan. 17, 1939

2,144,078

UNITED STATES PATENT OFFICE 2,144,078

COMPOUNDED MINERAL OIL

George L. Neely, Berkeley, Calif., assignor to Standard Oil Company of California, San Francisco, Calif., a corporation of Delaware No Drawing. Application May 11, 1937,
Serial No. 141,970

6 Claims. (Cl. 87—9)

This invention relates to a new and useful composition of matter comprising hydrocarbons of the lubricating oil type containing a basic aluminum salt of naphthenic acids. The new composition is particularly useful in crankcase lubricants for internal combustion engines because of its ability to inhibit or prevent piston ring sticking.

As is well known, the lubrication of heated metal parts and surfaces is often rendered difficult by virtue of the tendency toward decomposition evident in all liquid hydrocarbon and fatty lubricating oils upon subjection to high temperatures, especially if such exposure to high temperatures be in the presence of an oxidizing atmosphere. In decomposition of this character, plastic bodies appear as oxidation or polymerization products; these bodies may remain for a time in free suspension or dispersion in the lubricating oil, but eventually they tend to collect or accumulate in or on such machine parts as afford them shelter and, if such parts be exposed to heat, the bodies tend definitely to separate from the oil and build up in agglomerated masses as "gum", "sludge", "coke" or "carbon", to the ultimate detriment of the circulation of the oil and of the free motion of the parts intended to be lubricated and the final gumming and sticking of associated machine elements. As an instance of the effects brought about by the development of these eventually oil-insoluble decomposition products, the gumming and sticking of pistons and piston rings, particularly in aircraft and in automotive Diesel motors, may be noticed. In such motors, engine temperatures are high and operations at long-sustained high power output are usual; under such circumstances the aforesaid lubricating oil decomposition-, oxidation- and/or polymerization-products tend rapidly to collect in piston ring slots and, by gradual gumming and coking therein, effectively prevent the free motion of the rings: oil consumption is raised and power output is decreased. In automotive Diesel motors this condition is aggravated by contamination of the crankcase lubricating oil with partially oxidized fuel. Ultimately, piston rings become so fouled and stuck by the carbonization of the accumulated deposits that engine operation must be interrupted, for overhaul. This condition is, indeed, so serious that it may well be said that one of the most important properties to be considered in oils intended for use in aircraft motor and mobile Diesel motor lubrication is their ability to permit engine operation without piston gumming and ring-sticking, inasmuch as the actual length of operating life of such motors, between overhauls, is frequently determined by the necessity to free such piston rings. Solvent extraction methods of lubricating oil refinement seem not to have benefited this situation, for the reason that the solvent refined lubricating oils, although in themselves more stable to the formation of sludge or asphaltic bodies in service than were the customary products of acid or clay treatment, are inferior "solvents" for such formed or forming oil-insoluble bodies as eventually appear. As a result, piston gumming and ring sticking may be even more serious than was the case with the less stable but higher solvent power oils employed prior to the advent of these solvent extraction processes.

It is the primary purpose of my invention to disclose and provide liquid lubricating oils from which, in service, accumulations of such solid or plastic bodies as are formed by the oxidation, polymerization or decomposition of the mineral lubricating oils themselves, or by deposits, carbonaceous or otherwise, derived from the fuel, or by solid particles otherwise entering the engine, such as road dust, do not agglomerate in discrete oil-insoluble masses or find shelter in indifferently bathed machine parts, such as piston ring grooves, timing gears and the like, but in which, on the contrary, the said formed or forming bodies remain in essentially permanent and free suspension or dispersion.

It is a further purpose of my invention to disclose and provide liquid mineral oils which, in service, tend to remove or eliminate accumulations of such solid or plastic bodies as were previously formed and deposited, prior to the employment of the oils of my invention.

A further object of the invention is to provide a metal naphthenate compounding ingredient for lubricating oils which is less corrosive to certain bearing metals than naphthenates heretofore known.

I have found that by incorporating small amounts of basic aluminum salts of petroleum naphthenic acids in ordinary well refined lubricating oils of commerce (whether the said lubricating oils be natural or synthetic, overhead distillates or residua, and whether they be refined by treatment with acid, clay, selective solvent refining agents or combinations thereof), the above remarkable effects are brought about, namely: first, free and essentially permanent suspensions or dispersions of oil-insoluble solids or semi-solids may be designedly prepared, in which the oil-soluble naphthenic salts seem to act as dispersing or peptizing agents; second, free and essentially permanent suspensions or dispersions of such foreign bodies as are formed or introduced incident to engine operation result, without accumulation or deposition on lubricated parts or surfaces, with the result that pistons and piston rings remain free and clean, gum and sludge deposits do not accumulate, and power output, oil consumption and motor overhaul frequency are not adversely affected even under such aggravated circumstances as are encountered in automotive diesel and in aircraft motor operations.

In order to illustrate the utility of the invention and to acquaint those skilled in the art with the practice thereof and with the character and variety of the results to be obtained thereby, I give the folowing examples:

A single cylinder 2½ inch bore, 2½ inch stroke gasoline engine was set on the block and operated with various oils, uncompounded and compounded, in order to develop fully ring sticking and piston gumming tendencies under circumstances involving severe operating conditions. Operation of the motor was continuous, at 1600 R. P. M., except for periodic shut-down for inspection; the jacket temperature was maintained constant at 345° F. and sump oil temperature constant at 220° F. Under these closely controlled operating conditions, using the same motor fuel throughout, exceedingly close duplication of results was obtained, in spite of the presumably difficult and seeming uncertainty of the phenomena attempted to be measured.

The table below shows the character of the oils tested, with and without the addition of basic aluminum naphthenates and lists as accurately as may be the condition of the three piston rings at the conclusion of the motor operation on the indicated oil, when the motor was dismantled at the termination of the recorded number of hours running under the above conditions:

piston or rings, the #2 ring and the oil ring being immovable to the extent indicated above; oil similar to that used in run 81 containing 1% aluminum di-naphthenate, was then employed as a crankcase lubricant, and, after 2½ hours' operation, the stuck rings were entirely loosened and free.

In striking contrast to the appearance of the pistons and associated parts after operation with the uncompounded lubricating oils, the parts were bright and clean after operation with the lubricating oils containing dissolved basic aluminum naphthenates.

In further exemplification of the above-described effects:

A 125 horsepower, six cylinder Cummins Diesel engine was operated in connection with an electric dynamometer at variable speeds and loads in simulation of trucking operations on the level, ascending and descending grades, to an equivalent of about 4,000 miles. The condition of the piston rings is shown in the tabulation below: first, as they appeared after operation with a highly refined 54 viscosity at 210° F., 20 V. I. California lubricating oil; second, as they appeared after operation with the same oil to which had been added 1% by weight of an aluminum di-naphthenate.

| Run No. | Operating conditions | Name of oil | Piston rings stuck | Arc of ring stuck |
|---|---|---|---|---|
| | | | | Degrees |
| 4 | Variable speeds and loads. | Acid treated California lube oil. | No. 5 piston—top ring | 270 |
| | | | No. 6 piston—top ring | 360 |
| | | | No. 6 piston—2nd ring | 180 |
| 7 | Variable speeds and loads. | Acid treated California lube oil+1% aluminum di-naphthenate. | All rings free | |

Again:

The operation of the same 125 horsepower Cummins Diesel was changed to represent level road driving at constant speed and full load, in order to increase engine temperatures; the conditions represented trips of 300 miles each and an engine speed of 1600 R. P. M. (42 miles per hour) for a total of sixteen trips (4800 miles), at the conclusion of which the engine was disassembled for inspection. The appearance of the piston rings at the conclusion of the tests, run on the same crankcase lubricating oil (identical with that shown above in connection with the

| Run No. | Oil | | | Naphthenate added | Hours to cause sticking | Arc of rings stuck, degrees | | |
|---|---|---|---|---|---|---|---|---|
| | Origin | Vis. @ 210° | V. I. | | | #1 ring | #2 ring | Oil ring |
| 81 | California acid refined | 57 | | 1% aluminum di-naphthenate | 45+ | 0 | 0 | 0 |
| 82 | do | 54 | 20 | None | 30 | 0 | 180 | 360 |
| 84 | do | 54 | 20 | None | 30 | 360 | 360 | 360 |
| 85 | do | 55 | | 1% aluminum di-naphthenate | 45+ | 0 | 0 | 0 |
| 91 | Penna. aircraft | 100 | 101 | None | 22.5 | 180 | 180 | 0 |
| 93 | do | 106 | | 1% aluminum di-naphthenate | 22.5 | 0 | 0 | 0 |
| 99 | Pennsylvania | 68 | 106 | None | 15 | 180 | 0 | 0 |
| 100 | do | | | 1% aluminum di-naphthenate | 105+ | 0 | 0 | 0 |
| 104 | Mid-Continent solvent refined | 68 | 100 | None | 15 | 90 | 360 | 0 |
| 105 | do | 72 | | 1% aluminum di-naphthenate | 30+ | 0 | 0 | 0 |
| 109 | California acid refined | | | 1% aluminum mono-naphthenate | 45+ | 0 | (*) | 0 |
| 113 | California solvent refined | 57 | 33 | None | 30 | 0 | 360 | 0 |

* Sluggish.

Upon the conclusion of run 82, the motor was re-assembled without freeing or cleaning the variable speed, variable load tests), with and without the addition of 1.0% by weight of an aluminum di-naphthenate, are shown in the tabulation.

| Run No. | Operating conditions | Name of oil | Piston rings stuck | Arc of ring stuck |
|---|---|---|---|---|
| | | | | Degrees |
| 8 | Constant speed full load—severe service. | Acid treated California lube oil. | No. 2 piston—top ring | 90 |
| | | | No. 4 piston—top ring | 360 |
| | | | No. 4 piston—2nd ring | 90 |
| | | | No. 6 piston—top ring | 180 |
| | | | No. 6 piston—2nd ring | 90 |
| 9 | Constant speed full load—severe service. | Acid treated California lube oil+1% aluminum di-naphthenate. | No. 2 piston—top ring* | 30 |
| 10 | Constant speed full load—severe service. | Acid treated California lube oil. | No. 1 piston—top ring | 360 |
| | | | No. 2 piston—top ring | 90 |
| | | | No. 3 piston—top ring | 360 |
| | | | No. 4 piston—top ring | 360 |
| | | | No. 4 piston—2nd ring | 270 |
| | | | No. 5 piston—top ring | 360 |
| | | | No. 5 piston—2nd ring | 270 |
| | | | No. 6 piston—top ring | 120 |
| | | | No. 6 piston—2nd ring | 120 |

*In Run #9, the one ring that was stuck appeared to be wedged or stuck mechanically rather than by gum.

A further example of the gum- and sludge-removing properties of the compositions of my invention is illustrated by the clean-up of a gasoline bus engine: After operation on a straight, uncompounded lubricating oil, the bus motor was disassembled and found in a fouled condition, in that gummy and carbonaceous deposits were noted on the pistons, piston rings, rocker arms, timing gears and other parts of the engine. This engine was reassembled without cleaning up or removing the gummy and carbonaceous deposits, and was put back in operation on the same type of crankcase lubricating oil previously used, but containing 1.0% by weight of an aluminum di-naphthenate. After normal operation for a distance of 2700 miles, the bus engine was again disassembled for inspection: it was found that no sludge remained in the valve chamber, the crankcase or the timing gear case, that there was less head carbon, and that the oil ring slots had for the most part been cleaned.

Further exemplification of the cleansing effect referred to above was obtained by flushing four gasoline automobile engines with both straight, uncompounded mineral flushing oil and with the same flushing oil containing 2.0% by weight of an aluminum di-naphthenate. In each case, each engine was flushed twice, once with the straight uncompounded oil and once with the compounded oil of my invention; in two of the cases, the use of the straight oil preceded that of the compounded oil, while in the other two cases the reverse order was employed. Although the time of flushing was limited to five minutes only, examination of the oils drained from the crankcases showed that the compounded oil removed double the quantities of "asphaltenes" removed by the uncompounded oil.

While this flushing effect has been here particularly described with reference to internal combustion engine cleansing, the cleansing of other and analogous metal parts and surfaces is obviously within the purview of the practice of my invention.

The basic aluminum naphthenate which it is prefered to use at present, is a basic salt containing two equivalent weights of naphthenic acids and three equivalent weights (1 atom) of aluminum. Such a basic aluminum naphthenate may be prepared by adding to a neutral aqueous sodium naphthenate solution, a caustic alkali and a water-soluble aluminum salt, in proportions of one equivalent weight of hydroxide (OH) per three equivalent weights of aluminum. The water-insoluble basic aluminum naphthenate thus formed will be precipitated and the sodium will remain in solution.

An aluminum naphthenate in which less than three equivalent weights of the naphthenic acids are used per three equivalent weights of aluminum is probably a mixture of salts giving, for instance, an average proportion of two equivalent weights of naphthenic acid to three of aluminum and not merely a single salt. Various proportions of aluminum mono-naphthenate and aluminum di-naphthenate, together with the normal salt, may exist in heterogeneous mixtures in the compound. In any event such a mixture may be considered a basic rather than a normal salt so long as there is present insufficient naphthenic acid to satisfy the normal valence of the metal. For simplicity of definition an aluminum naphthenate containing two equivalent weights of naphthenic acid to three of aluminum is termed aluminum di-naphthenate, and one containing one equivalent weight of naphthenic acid to three of aluminum is designated aluminum mono-naphthenate.

Basic aluminum naphthenates are superior to normal naphthenates for the reason that lubricating oils containing them show rates of wear of lubricated motor parts, and particularly bearings, lower than that of lubricating oils containing normal naphthenates heretofore disclosed in the prior art. This reduced corrosivity of basic aluminum naphthenates is illustrated by corrosion tests which were carried out in the following manner:

Glass tubes 2 inches in diameter and 20 inches long were immersed in an oil bath, the temperature of which was automatically controlled to within ±1° F. of 300° F. Approximately 300 cc. of oil under the test was placed in each tube and air was bubbled through it at the rate of 10 liters per hour. Strips of conventional cadmium-silver and copper-lead bearing metals were cut to size and placed in the oils. The bearing metal strips were weighed before and after the test to determine the loss of metal due to the corrosive action of the compounded lubricating oil thereon. The duration of the test was 72 hours. The results of such comparative tests show aluminum di-naphthenate to be approximately ⅓ as corrosive as zinc naphthenate and approximately $\frac{1}{10}$ as corrosive as cobalt naphthenate to cadmium-silver bearing metals.

In high temperature motor operations corrosion rates are about twice as high with aluminum tri-naphthenate, i. e. normal naphthenate, as with either aluminum di-napththenate or mono-naphthenate on copper-lead and cadimum-silver bearings; babbitt bearings are but slightly, if at all, affected under ordinary motor operating conditions.

Methods of preparing naphthenic acids suitable for the present composition are known. Briefly, these acids are prepared by extracting the naturally occurring naphthenic acids from crude petroleum oils or other distillates containing them, usually by washing the said oils with dilute aqueous caustic soda solution whereby water soluble alkali naphthenates are formed. The alkali naphthenate solution may then be extracted with organic solvents to remove the larger proportion of inert mineral oil contained therein. Either the alkali naphthenate so obtained or the free naphthenic acids liberated therefrom are suitable for preparation of the oil soluble salts as previously described. It is within the broader scope of my invention to use naphthenic acids obtained from other sources, for instance, from controlled oxidation of naphthenic hydrocarbons.

Although I have described my lubricating composition as containing approximately 1% of basic aluminum naphthenates, it is apparent that the proportion may be varied from this preferred amount. Approximately 0.75% of aluminum di-naphthenate has been found to be operative to prevent piston ring sticking. A measurable effect is obtained with as little as 0.5% of aluminum di-naphthenate. The naphthenate may be incorporated in amounts greater than 1% but it has been found that the benefits do not increase in proportion to the added amount of aluminum di-naphthenate. An undesirable increase in viscosity is caused by amounts of aluminum dinaphthenate greater than approximately 1.5%.

A basic aluminum naphthenate concentrate capable of dilution with mineral oil to produce a homogeneous crankcase lubricant containing approximately 1% of the naphthenate, is to be regarded as within the scope of my invention. For instance, a 10% solution of aluminum di-naphthenate in mineral lubricating oil may be utilized for this purpose. Other suitable organic solvents for basic aluminum naphthenates which are capable of dilution with mineral oil and which are suitable for preparation of a concentrate will be apparent to those skilled in the art.

Crankcase lubricating oils containing basic aluminum naphthenates according to my invention may also have present other compounding ingredients such as oxidation inhibitors, pour-point depressors, blooming agents, and materials which improve the extreme pressure film strengths of the oil.

This application is a continuation-in-part of my co-pending application Serial No. 38,791 filed August 31, 1935, on Compounded mineral oils.

While I have described in detail the character of my invention and given numerous illustrative examples of the preparation and application of the composition of my invention, I have done so by way of illustration only and with the intention that no limitation should be imposed upon the invention thereby. It will be obvious to those skilled in the art that numerous modifications and variations of the above illustrative examples may be effected in the practice of my invention, which is of the scope of the claims appended hereto.

I claim:

1. A liquid mineral oil lubricating composition containing approximately 1% of aluminum di-naphthenate dissolved therein.

2. A liquid mineral oil lubricating composition containing from approximately 0.5% to approximately 1.5% of a basic aluminum salt of naphthenic acids dissolved therein.

3. A liquid mineral oil lubricating composition containing a small amount of aluminum di-naphthenate dissolved therein, said small amount of naphthenate being insufficient to increase the viscosity of the lubricating composition above the viscosity of crankcase lubricants for internal combustion engines.

4. An anti-ring sticking addition agent for crankcase lubricating oils comprising a concentrated solution in mineral lubricating oil of basic aluminum naphthenate, said solution being capable of dilution with mineral lubricating oil to form a homogeneous mixture containing approximately 1% by weight of the basic aluminum naphthenate based on the total amount of lubricant.

5. An anti-ring sticking addition agent for crankcase lubricating oils comprising a concentrated solution in mineral lubricating oil of aluminum di-naphthenate capable of dilution with mineral lubricating oil to form a homogeneous mixture containing approximately 1% by weight of the di-naphthenate based on the total amount of lubricant.

6. A liquid mineral oil lubricating composition containing a small amount of aluminum mono-naphthenate dissolved therein, said small amount of naphthenate being insufficient to increase the viscosity of the lubricating composition above the viscosity of crankcase lubricants for internal combustion engines.

GEORGE L. NEELY.